United States Patent [19]

Warren et al.

[11] Patent Number: 5,912,921
[45] Date of Patent: Jun. 15, 1999

[54] CONCURRENT MULTIPLE DATA RATE COMMUNICATIONS IN A WIRELESS LOCAL AREA NETWORK

[75] Inventors: Bruce G. Warren, Poulsbo; Alan F. Jovanovich, Des Moines; John W. Mensonides, Monroe, all of Wash.

[73] Assignee: Intermec IP Corp., Beverly Hills, Calif.

[21] Appl. No.: 08/915,260

[22] Filed: Aug. 20, 1997

[51] Int. Cl.[6] .................................................. H04B 1/38
[52] U.S. Cl. .......................... 375/220; 375/221; 375/225; 370/332; 455/67.4; 371/5.5
[58] Field of Search ..................... 375/220, 221, 375/222, 258, 225; 370/338, 241, 465, 245, 468, 247, 522, 251, 252, 253, 329, 332, 333, 335; 371/5.1, 5.3, 5.5; 455/67.1, 67.4, 422, 517

[56] References Cited

U.S. PATENT DOCUMENTS 4,788,697 11/1988 Bell et al. ................................ 375/364
5,448,593 9/1995 Hill .
5,483,676 1/1996 Mahany et al. ......................... 455/67.4
5,491,457 2/1996 Feher .
5,504,757 4/1996 Cook et al. .............................. 370/468
5,524,122 6/1996 Lepitre et al. .......................... 375/222

Primary Examiner—Don N. Vo
Assistant Examiner—Lenny Jiang
Attorney, Agent, or Firm—Graham & Jones LLP

[57] ABSTRACT

A wireless local area network (WLAN) provides optimal data throughput by operating at multiple data rates simultaneously. The WLAN includes a network master communicating with a plurality of remote client transceiver nodes. The network master maintains a table of active client transceiver nodes. The table includes a current data rate for each of the active client transceiver nodes. Periodic high-speed and low-speed beacon signals are transmitted from the network master to the active client transceiver nodes. Each of the active client transceiver nodes receives and processes the beacon signals to determine an optimal data rate. Then, each of the active client transceiver nodes transmits a return signal to the network master which designates the determined optimal data rate. Thereafter, the network master updates the table to reflect the optimal data rate for each of the active client transceiver nodes. Subsequent messages from the network master to the active client transceiver nodes are thereby transmitted at the current data rate for each respective one of the active client transceiver nodes.

33 Claims, 6 Drawing Sheets

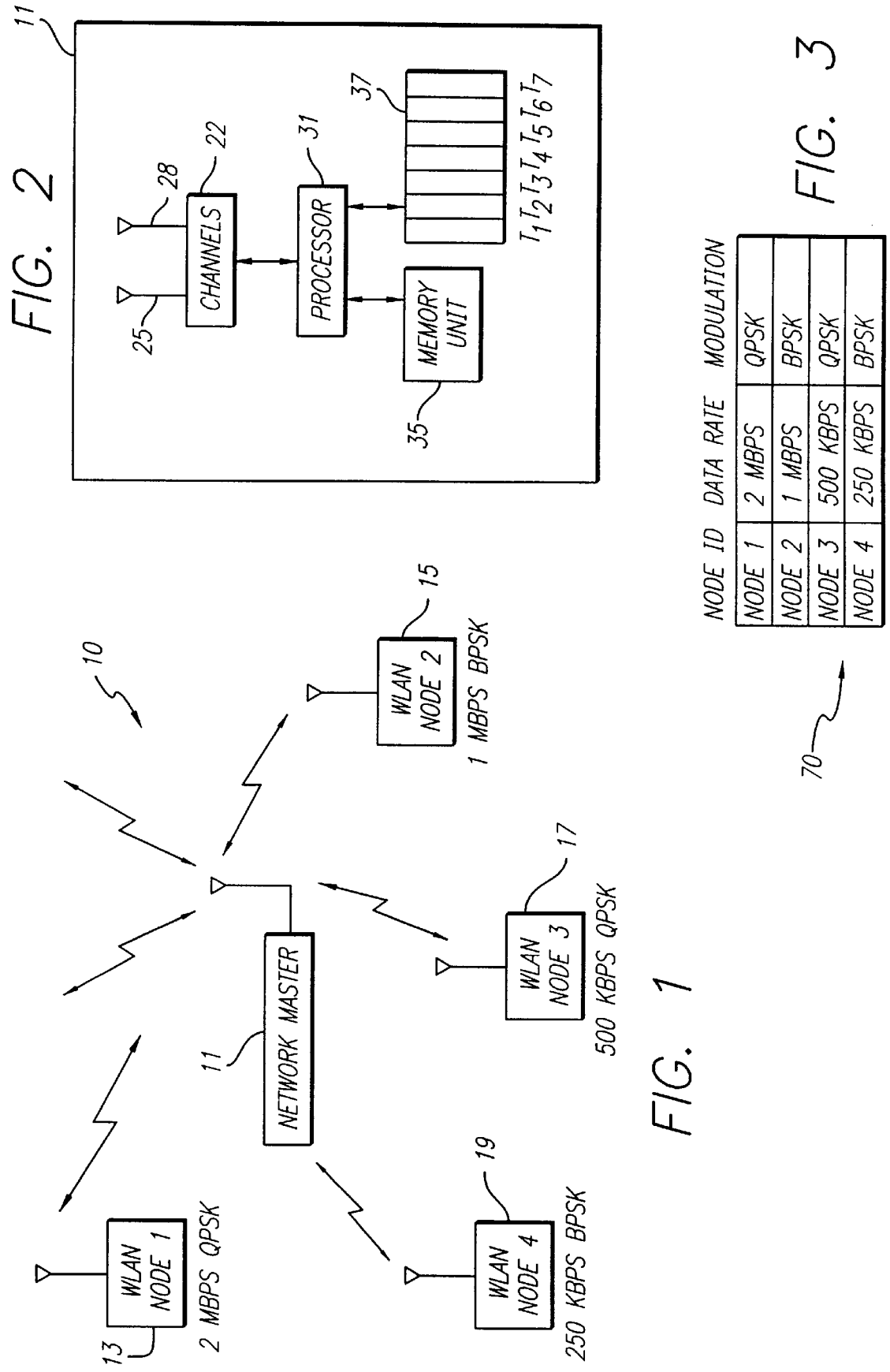

CONCURRENT MULTIPLE DATA RATE COMMUNICATIONS IN A WIRELESS LOCAL AREA NETWORK

BACKGROUND OF THE INVENTION

1. Field of the Invention

The present invention relates to radio transceivers for direct sequence spread spectrum communications, and more particularly, to a wireless local area network in which each of a plurality of radio transceivers on the network can operate at different data rates simultaneously.

2. Description of Related Art

Spread spectrum modulation techniques are increasingly desirable for communications, navigation, radar and other applications. In a spread spectrum system, the transmitted signal is spread over a frequency band that is significantly wider than the minimum bandwidth required to transmit the information being sent. As a result of the signal spreading, spread spectrum systems have reduced susceptibility to interference or jamming, and enable high data integrity and security. Moreover, by spreading transmission power across a broad bandwidth, power levels at any given frequency within the bandwidth are significantly reduced, thereby reducing interference to other radio devices. In view of these significant advantages, spread spectrum communication systems are highly desirable for commercial data transmission.

In one type of spread spectrum communication system, a radio frequency ("RF") carrier is modulated by a digital code sequence having a bit rate, or chipping rate, much higher than a clock rate of the information signal. These spread spectrum systems are known as direct sequence ("DS"), or code division multiple access ("CDMA") modulation systems. The RF carrier may be binary or quadrature modulated by one or more data streams such that the data streams have one phase when a code sequence represents a data "one" and a predetermined phase shift (e.g., 180° for binary, and 90° for quadrature) when the code sequence represents a data "zero." These types of modulation are commonly referred to as binary phase shift key ("BPSK") and quadrature phase shift key ("QPSK") modulation, respectively.

It is also known to use a plurality of spread spectrum radio transmitter/receivers ("transceivers") that are coupled together in a wireless local area network ("WLAN"). A central host processing unit (i.e., a "network master" or "base station") sends information to and receives information from any one of the plurality of remotely disposed client transceiver nodes. In such a WLAN, the remote client transceivers may comprise portable units that operate within a defined environment to report information back to the network master. Each of the remote client transceivers communicate with the network master using the same RF carrier frequency and digital code sequence. It should be apparent that such WLAN systems offer increased flexibility over hard-wired systems by enabling operators of the remote transceivers substantial freedom of movement through the environment.

The individual client transceiver nodes amplify and filter an RF signal transmitted from the host processing unit to remove the RF carrier and provide a digital information signal that has been modulated by the digital code sequence. The client transceiver node then "de-spreads" the digital signal by use of a digital matched filter that is correlated with the digital code sequence to remove the modulation and recover the digital information. Discrete digital bits of the de-spread digital information are then assembled into packets having a predefined format that can be processed subsequently by use of conventional data processing logic systems, such as a microprocessor, digital signal processor, and the like.

In a communication system, energy gain can be defined as the signal-to-jamming ratio. The higher the signal-to-jamming ratio, the more immune the transceiver is to jamming interference (or background noise) which increases the effective range of the transceiver. For BPSK or QPSK communication systems operating without receiver diversity, the process gain is essentially identical to the energy gain. The process gain in spread spectrum processors may be defined as bandwidth (BW) available for communicating an information signal divided by the data rate ($R_b$).

In decibels (dB), this ratio is defined as follows:

$$PG_{dB} = 10 \log_{10} (BW/R_b)$$

According to the preceding equation, for a fixed bandwidth, the processing gain increases as the data rate is decreased. By fixing the chipping rate, the bandwidth is also fixed. A fixed bandwidth is desirable since it allows optimization of the transmit and receive RF circuitry. Therefore, a lower data rate will provide more jamming or noise immunity than a higher data rate, and the processing gain of the transceiver is increased approximately 3 dB each time the data rate is halved. Even though the increased jamming immunity is desirable in such WLAN systems, the associated reduction in data rate tends to degrade the data throughput for the overall WLAN system.

In conventional WLAN system architectures, the Medium Access Control ("MAC") in the network master monitors the transceiver signal integrity. Each message transaction with a particular client transceiver node within the WLAN begins at a less complex modulation scheme, i.e., BPSK, and can be switched within the message transaction to a more complex modulation scheme, i.e., QPSK, so as to increase the data rate. If the received signal quality degrades below a set limit, the MAC will try to maintain a relatively reliable channel by switching back from QPSK to BPSK to reduce the data rate and increase the transceiver process gain. At the less complex modulation scheme of BPSK, the transceiver process gain is increased 3 dB, as described above. An advantage of this approach is that each client transceiver node can operate at a different data rate. Other WLAN system architectures that do not begin each message transaction at the less complex modulation scheme must reduce all transceivers to a lower data rate if signal integrity to any one transceiver becomes degraded. A drawback of each of these prior art WLAN system architectures is that the amount of transceiver process gain increase due to changing data rates is limited, and the MAC cannot readily optimize data rates with individual client transceiver nodes without repeated switching between data rates.

Thus, it would be desirable to provide a WLAN which can operate at multiple data rates simultaneously to optimize performance of each client transceiver node of the WLAN.

SUMMARY OF THE INVENTION

In accordance with the teachings of the present invention, a WLAN is provided that provides optimal data throughput by operating at multiple data rates simultaneously. The WLAN includes a central host processing unit communicating with a plurality of remote client transceiver nodes.

More particularly, the network master of the WLAN maintains a table of active client transceiver nodes. The table includes a current data rate for each of the active client transceiver nodes. A periodic high-speed beacon signal and a periodic low-speed beacon signal are transmitted from the network master to each of the active client transceiver nodes. The active client transceiver nodes receive and process both beacon signals to determine which of the plurality of data rates provides an optimal performance level. Then, each of the active client transceiver nodes transmits a return signal to the network master which designates the determined optimal data rate. Thereafter, the network master updates the table to reflect the optimal data rate as the current data rate for each of the active client transceiver nodes. Subsequent messages from the network master to the active client transceiver nodes are thereby transmitted at the current data rate for each respective one of the active client transceiver nodes. In an embodiment of the invention, the plurality of data rates includes rates of 2 megabits per second, 1 megabits per second, 500 kilobits per second, and 250 kilobits per second.

A more complete understanding of the WLAN having concurrent multiple data rates will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a diagram of a wireless local area network according to an embodiment of the present invention;

FIG. 2 is a block diagram of a network master for use in the wireless local area network of FIG. 1;

FIG. 3 is an illustration of a data rate association table for use by the network master of FIG. 2;

DETAILED DESCRIPTION OF THE PREFERRED EMBODIMENT

Figure 4:
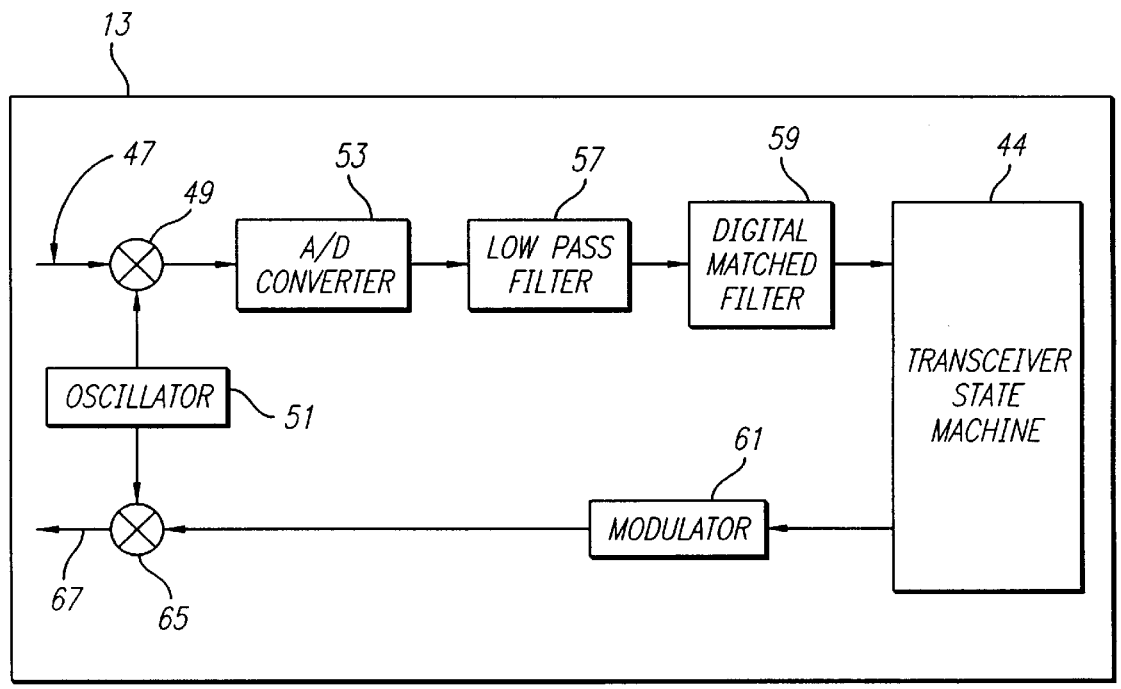
FIG. 4 is a block diagram of a client transceiver node for use in the local area network of FIG. 1.

The present invention satisfies the need for a WLAN which can operate at multiple data rates simultaneously to achieve optimized performance of each client transceiver node of the WLAN. In the detailed description that follows, it should be appreciated that like element numerals are used to describe like elements illustrated in one or more of the figures.

Referring first to FIG. 1, an exemplary Wireless Local Area Network ("WLAN") 10 is illustrated according to a first embodiment of the present invention. The WLAN 10 includes a central host processing unit, such as a base station or network master 11, and four remote client transceiver nodes 13, 15, 17, 19. In the example illustrated, all client transceiver nodes 13, 15, 17, 19 support the following data rates and modulation types: (1) 1 megabits per second ("MBPS") with BPSK modulation; (2) 2 MBPS with QPSK modulation; (3) 250 kilobits per second ("KPBS") with BPSK modulation; and (4) 500 KPBS with QPSK modulation. For illustrative purposes, the first client transceiver node 13 currently operates at 2 MBPS QPSK, the second client transceiver node 15 currently operates at 1 MBPS BPSK, the third client transceiver node 17 operates at 500 KBPS QPSK, and the fourth client transceiver node 19 operates at 250 KBPS BPSK. It should be apparent, however, that other data rates and modulation types may be used. In addition, a fewer or greater number of client transceiver nodes may be used in the WLAN.

The network master 11 is a fixed station within the network 10 that communicates with each of the client transceiver nodes 13, 15, 17, 19. Transmissions within the network are broadcast over a wide coverage region. FIG. 2 is a block diagram of a network master 11 for use with the method and apparatus of the present invention. Preferably, the network master 11 is located at the center or at an edge of the network's coverage region. The network master 11 may include a plurality of radio channels 22, transmitter antennas 25, and receiver antennas 28. Alternatively, a single antenna may be utilized for both transmission and receipt of data signals. In addition, the network master 11 may include one or more processors 31, memories 35, and timers 37, for processing, storing, and timing signals, respectively, prior to transmission and upon receipt.

In a first embodiment of the present invention, the network master 11 monitors the data rates of numerous client transceiver nodes by emitting a high-speed beacon at 1 MBPS and a low-speed beacon of 250 KBPS at predetermined intervals. More particularly, the network master 11 uses the timers 37 to time the delay between successive transmissions of the high-speed and low-speed beacons. In addition, the network master memory unit 35 stores a data rate association table 70 as shown in FIG. 3. The table 70 holds a list of client transceiver nodes (shown as NODE ID), a list of data rates (shown as DATA RATE) for each client transceiver node, and a list of modulation schemes (shown as MODULATION) for each client transceiver node. The data rate list and the modulation scheme list indicate the rate and modulation of the last successful transmission corresponding to a particular client transceiver node. The processor 31 modifies and updates the table 70, as described in greater detail below.

FIG. 4 is a block diagram of a client transceiver node 13 for use in the WLAN. The client transceiver node 13 includes a local oscillator 51, an analog-to-digital ("A/D") converter 53, a low pass filter 57, a digital matched filter 59, a modulator 61, and a transceiver state machine 44. The client transceiver node 13 receives an RF input signal 47, and downconverts the RF signal 47 to a baseband signal by multiplying the received signal with a carrier frequency generated by the local oscillator 51. The downconverted signal is then converted from analog to digital by the A/D converter 53, and may also be filtered by the low pass filter 57 to remove any aliasing noise. Thereafter, the received signal is in the form of a multi-bit digital signal having a chipping rate of the spreading code originally used to modulate the digital information of the signal. The digital matched filter 59 correlates the multi-bit digital signal with the spreading code to recover the digital information and a clock signal. The digital information and clock signal are then provided to the transceiver state machine 44 for further processing. On the transmit side, the client transceiver node 13 essentially reverses the receive process described above. A digital signal from the transceiver state machine 44 is modulated by the spreading code by a modulator 61. The modulated transmit signal is then multiplied with the carrier frequency generated by the local oscillator 51 to produce an RF transmit signal 67.

As known in the art, the received and transmitted signals may additionally include two signal components, called the I channel and the Q channel, having phases that are 90° from each other. The separate I and Q components would be processed in the same manner described above to yield multi-bit digital signals. It should be appreciated that these well known aspects of a transceiver would be included in an operational system. To simplify the present detailed description, further description of these well known aspects is omitted.

Figure 5:
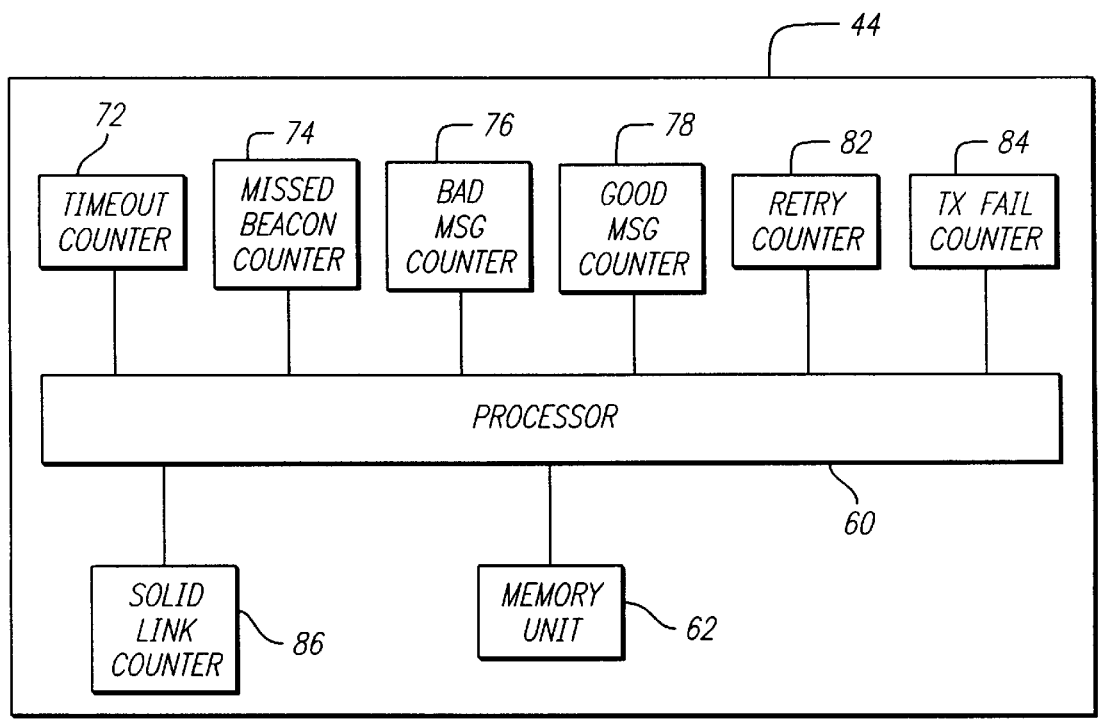
FIG. 5 is a block diagram of a transceiver state machine for use in the client transceiver node.

FIG. 5 is a block diagram of the transceiver state machine 44 of a client transceiver node. The transceiver state machine 44 processes data transmitted by the network master 11. The state machine 44 includes one or more data processors 60. The transceiver state machine 44 employs seven counters 72, 74, 76, 78, 82, 84, 86 to control the data rate of the transceiver. A missed beacon counter 74 counts the number of missed high-speed beacons and/or low-speed beacons. Missed beacons are counted based upon an expected number of beacons over a predetermined time period. A bad message counter 76 and a good message counter 78 count the number of good and bad messages received, respectively, based upon the quality of the transmitted data. A retry counter 82 counts the number of attempts to retry reception of data from the network master 11. A transmission fail counter 84 counts the number of total failed transmissions between the transceiver and the network master 11. A timeout counter 72 counts the number of timeouts that occur during transmission. A solid link counter 86 counts the number of times that a solid transmission is formed by detecting an acknowledgment from the network master 11.

The transceiver state machine 44 further includes a memory unit 62 for storing state information and data as instructed by the data processor 60. In addition, the memory unit 62 stores the result of information output from the counters together with predetermined thresholds for each counter. The processor compares the counted information to the predetermined threshold in managing the data rate for the transceiver.

Figure 6:
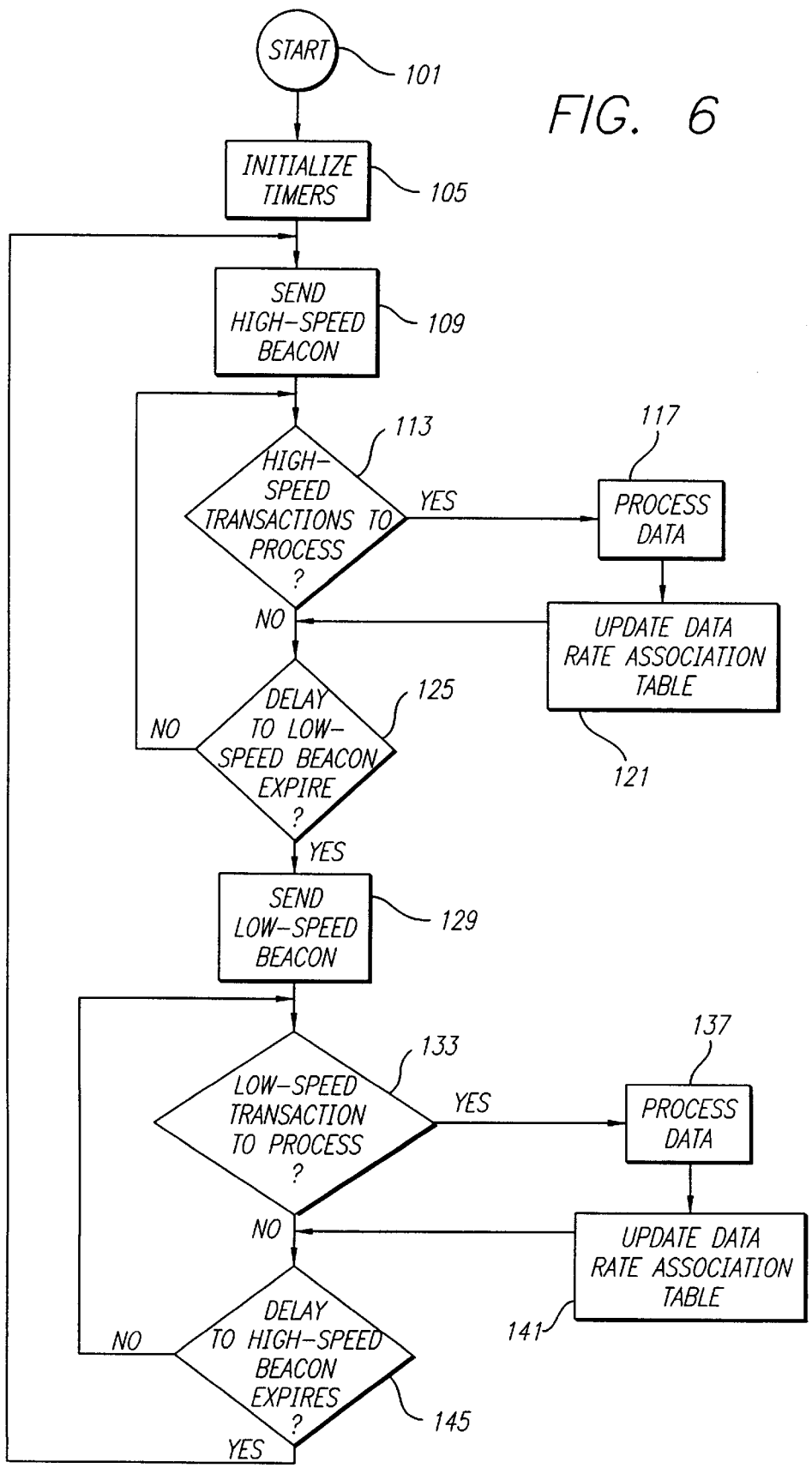
FIG. 6 is a flow chart illustrating processing by the network master.

FIG. 6 is a flow chart illustrating the processing of data by the network master 11. Processing begins at a start instruction 101. At step 105, the network master initializes the timers 37 that are used in timing the transmission of the high-speed and low-speed beacons. In step 109, the network master 11 transmits the high-speed beacon. The beacon may be received by one or more client transceiver nodes (processing of signals by client transceiver nodes is described below). In step 113, the network master 11 enters a loop to determine whether or not a regular data transaction must be processed at the high speed. This determination is made based upon acceptance of the high-speed signal by one or more client transceiver nodes. If the high-speed beacon is accepted, the network master 11, in step 117, processes the data at the higher data rate (e.g., 2 MBPS). Once the data is processed, the network master 11 updates the data rate association table 70 to reflect the new data rate and modulation scheme employed by each client transceiver node.

As stated above, the timers 37 of the network master 11 delay transmission of the low-speed beacon by a predetermined time period following transmission of the high-speed beacon. The network master 11 exits the loop of steps 113–121 when the delay to the low-speed beacon has expired in step 125. In step 129, the network master 11 transmits the low-speed beacon. Low-speed transactions are then processed in a loop between steps 133–141. As with the high-speed beacon, the network master 11 determines whether or not transactions must be processed at the low-speed based upon acceptance by one or more client transceiver nodes. In step 137, regular data transmitted by a client transceiver node is processed. The network master 11, in step 141, updates the data rate association table 70 to reflect the new data rates and modulation schemes for each client transceiver node. When the delay to the high-speed beacon expires in step 145, the network master 11 exits the loop and returns to step 109 for transmission and processing of the high-speed beacon.

Figure 7:
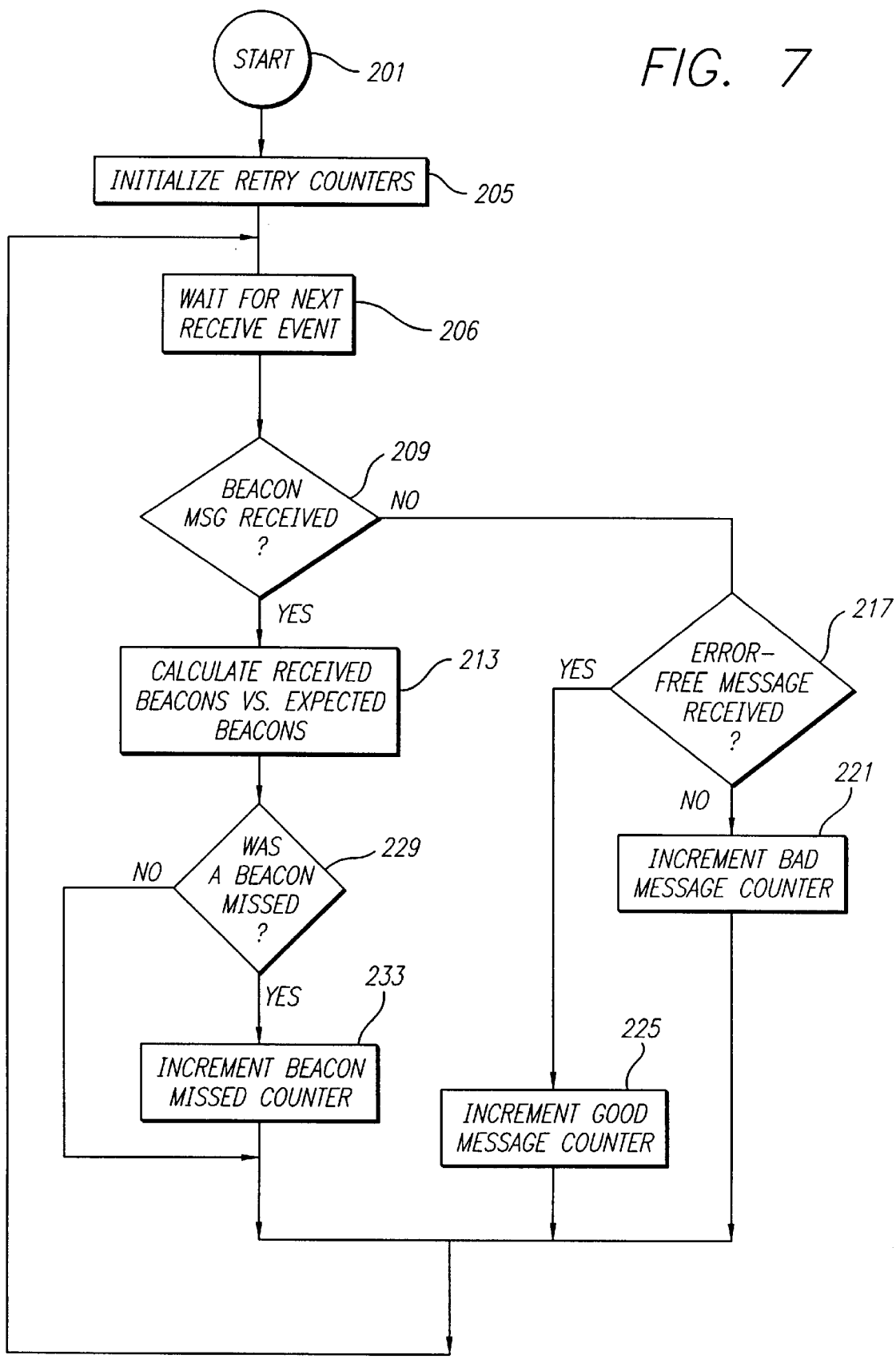
FIG. 7 is a flow chart illustrating the receipt of data by the client transceiver node.
Figure 8:
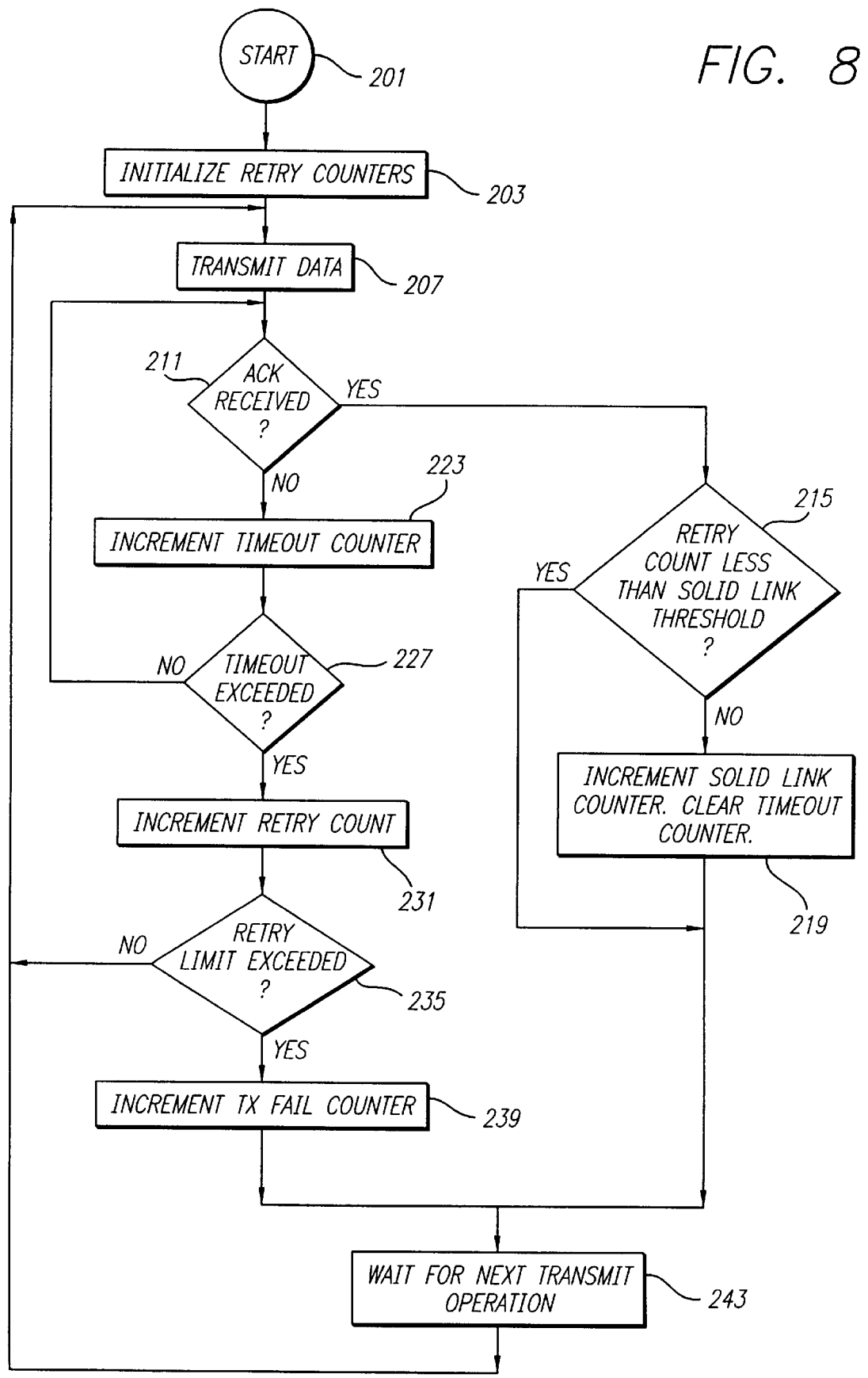
FIG. 8 is a flow chart illustrating the transmission of data by the client transceiver node.
Figure 9:
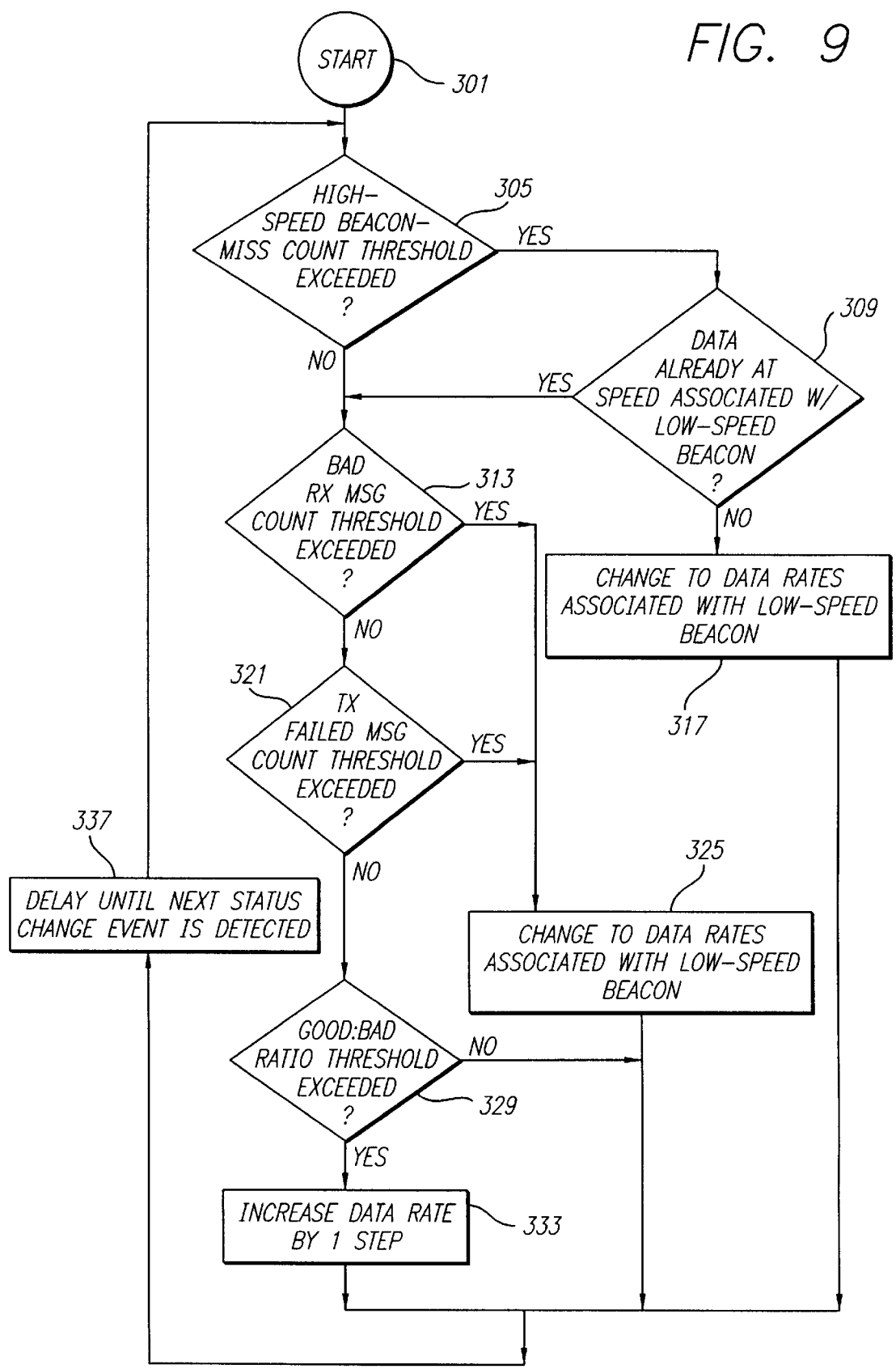
FIG. 9 is a flow chart illustrating the control over data rates by the client transceiver node.

FIGS. 7–9 illustrate processing by a client transceiver node to control the data rate between the transceiver and the network master 11. Each client transceiver node 13, 15, 17, 19 performs several functions to control the data rate. First, each client transceiver node uses a missed-beacon counter 74 to maintain a running total of missed high-speed and low-speed beacons. This total is counted for a predetermined number of expected beacons. For a higher number of expected beacons, a higher degree of accuracy may be obtained. Second, each client transceiver node uses a bad message counter 76, a good message counter 78, and a retry counter 82 to keep a running total of messages that have been transmitted and/or received with a retry. Finally, each client transceiver node increases or decreases the data rate based upon the number of message retries and/or missed high-speed beacons.

FIG. 7 is a flow chart illustrating the receipt of beacons and messages by a client transceiver node. The receive process is initiated by a start signal in step 201. At step 205, the transceiver initializes the missed beacon counter 74 and the bad message counter 76. At step 206, the transceiver state machine 44 awaits a receive event, and at step 209, the transceiver state machine 44 determines whether or not an expected beacon message has been received. If the beacon is not received, the transceiver state machine 44 determines whether or not an error-free message has been received in step 217. If an error-free message has been received, the good message counter 78 is incremented by one in step 225. Otherwise, the transceiver state machine 44 increments the bad message counter 76 by one in step 221. If a beacon has been received, the transceiver state machine 44 calculates the ratio of received beacons to expected beacons in step 213. In step 229, the client transceiver node analyzes the received beacon/expected beacon ratio. If a beacon was missed, the beacon missed counter 74 is incremented by one. Processing then resumes at step 206.

FIG. 8 is a flow chart illustrating a transmitting operation by the client transceiver node. Processing begins with a start signal in step 201. At step 203, the transceiver state machine 44 initializes the retry counters 82. Next, the transceiver state machine 44 transmits data at step 207. If an acknowledge is received from the network master in step 211, the transceiver state machine 44 goes to step 215. In step 215, the transceiver state machine 44 compares the retry count to the solid link count. If the retry count is greater than the solid link count, the solid link counter 86 is incremented and the timeout counter 72 is cleared in step 219. Alternatively, if the solid link count exceeds the retry count, the transceiver state machine 44 awaits the next transmit operation in step 243 and returns to step 207 to transmit data.

If the transceiver state machine 44 does not receive an acknowledgment from the network master, the transceiver state machine 44 enters a loop including steps 223 and 227 to wait for an acknowledgment. The loop is executed in accordance with a predetermined timeout count. During each execution of the loop, the timeout counter 72 is incremented in step 223. When the timeout count is exceeded in step 227, the transceiver state machine 44 enters another loop including steps 231 and 235 to retry the data transmission. The retry loop is executed in accordance with a predetermined retry limit. During each execution of the loop, the retry counter 82 is incremented in step 231. When the retry limit has been exceeded in step 235, the transceiver state machine 44 increments the transmission fail counter 84 in step 239. The transceiver state machine 44 then awaits the next transmission operation in step 243 and returns to step 207.

FIG. 9 is a flow chart describing the data rate control process performed within each client transceiver node. Processing begins with a start signal in step 301. In step 305, the transceiver state machine 44 compares the number of missed high-speed beacons to a predetermined missed-beacon threshold. If the count exceeds the threshold, the client transceiver node changes to a data rate associated with the low-speed beacon at step 317 unless it determines at step 309 that it is already communicating at one of those data rates. If the client transceiver node is communicating at low data rates or the missed-beacon threshold has not been surpassed, the transceiver state machine 44 analyzes the clarity of sent messages. The transceiver state machine 44 compares the number of bad received and transmitted messages to predetermined thresholds in steps 313 and 321, respectively. If either or both of these counts are exceeded, the client transceiver node changes to data rates associated with the low-speed beacon at step 325. If neither of these thresholds has been exceeded, the transceiver state machine 44 compares the ratio of good messages and bad messages to a predetermined threshold at step 329. If the good/bad ratio exceeds the threshold, the transceiver increases the data rate by one step at step 333. Otherwise, the transceiver enters a delay loop at step 337 until another status change event is detected.

In a second embodiment of the present invention, support is provided for client transceiver nodes that lack the ability to operate at all available data rates. For example, certain client transceiver nodes are not capable of monitoring the lower data rates. Accordingly, a channel reservation mechanism including a request-to-send/clear-to-send system ("RTS/CTS"), may be provided, such as that defined by the Institute of Electrical and Electronics Engineers ("IEEE") 802.11 standard.

The 802.11 RTS/CTS system is a WLAN standard, whereby the network master 11 reserves a frequency for a predetermined time interval. During this time interval, all other communication traffic is temporarily suspended. As an example, assume that client transceiver nodes 13, 15 are capable of receiving the high-speed beacon signal, but not the low-speed beacon signal. Accordingly, the network master 11 would emit a RTS signal or similar message at the high speed immediately prior to initiating low-speed message transfers. The RTS message reserves the channel for the duration of the low-speed message transfers. During this time period, client transceiver nodes 13, 15 would not transmit any messages. As a result, all client transceiver nodes can communicate with the network master 11 at different data rates without interfering with respective signals.

Having thus described a preferred embodiment of a method and apparatus for concurrent multiple data rate communications in a wireless local area network, it should be apparent to those skilled in the art that certain advantages of the within system have been achieved. It should also be appreciated that various modifications, adaptations, and alternative embodiments thereof may be made within the scope and spirit of the present invention. For instance, a base station and remote devices have been illustrated, but it should be apparent that the method and apparatus of the present invention would be equally applicable to a peer-to-peer network. The invention is further defined by the following claims.

What is claimed is:

1. A method for operating a wireless local area network having a network master communicating with a plurality of remote client transceiver nodes at plural data rates comprising the steps of:

maintaining a table of active client transceiver nodes at said network master, said table including a current data rate for each of said active client transceiver nodes;

transmitting an expected number of first beacon signals and second beacon signals;

receiving and processing a received number of said first and second beacon signals at each of said active client transceiver nodes;

determining an optimal data rate based upon a difference between said expected number of first and second beacon signals and said received number of first and second beacon signals;

transmitting a return signal from each of said active client transceiver nodes to said network master designating said determined optimal data rate; and updating said table to reflect said optimal data rate as said current data rate for each of said active client transceiver nodes, wherein subsequent messages from said network master to said active client transceiver nodes are transmitted at said current data rate for each respective one of said active client transceiver nodes.

2. The method for operating a wireless local area network of claim 1, further comprising the step of maintaining a count of said received number of first and second beacons.

3. The method for operating a wireless local area network of claim 1, further comprising the steps of:

attempting to receive a plurality of messages at each of said active client transceiver nodes;

re-trying to receive ones of said plurality of messages not received during said attempting step; and maintaining a count of said re-tried ones of said plurality of messages.

4. The method for operating a wireless local area network of claim 3, wherein the step of determining an optimal data rate further comprises the steps of:

selecting a data rate lower than said current data rate when said count of said re-tried ones of said plurality of messages exceeds a predetermined number of acceptable re-tried messages; and selecting a data rate higher than said current data rate when said count of said re-tried ones of said plurality of messages is less than a predetermined number of acceptable re-tried messages.

5. The method for operating a wireless local area network of claim 1, further comprising the steps of:

transmitting a channel reservation message at a first data rate; and receiving and processing subsequent messages at a second data rate a predetermined time period following said transmission of said channel reservation message.

6. The method for operating a wireless local area network of claim 1, wherein said first beacon signals are transmitted at a first data rate and said second beacon signals are transmitted at a second data rate.

7. The method for operating a wireless local area network of claim 1, wherein said table further includes a current modulation type for each of said active client transceiver nodes.

8. The method for operating a wireless local area network of claim 7, wherein said step of determining an optimal data rate further comprises determining an optimal modulation type based upon said difference between said expected number of first and second beacon signals and said received number of first and second beacon signals.

9. The method for operating a wireless local area network of claim 8, wherein said step of transmitting a return signal further comprises transmitting a return signal from each of said active client transceiver nodes to said network master designating said determined optimal modulation type.

10. The method for operating a wireless local area network of claim 9, wherein said step of updating said table further comprises updating said table to reflect said optimal modulation type as said current modulation type for each of said active client transceiver nodes, wherein subsequent messages from said network master to said active client transceiver nodes are transmitted at said current modulation type for each respective one of said active client transceiver nodes.

11. A wireless local area network operable at plural data rates comprising:
    a network master having a table of active client transceiver nodes at said network master, said table including a current data rate for each of said active client transceiver nodes, said network master transmitting an expected number of first beacon signals and second beacon signals;
    a plurality of client transceiver nodes adapted to receive and process a received number of said first and second beacon signals at each of said active client transceiver nodes, said client transceiver nodes determining an optimal data rate based upon a difference between said expected number of first and second beacon signals and said received number of first and second beacon signals, said client transceiver nodes transmitting a return signal to said network master designating said determined optimal data rate;
    wherein, said network master updates said table to reflect said optimal data rate as said current data rate for each of said active client transceiver nodes, wherein subsequent messages from said network master to said active client transceiver nodes are transmitted at said current data rate for each respective one of said active client transceiver nodes.

12. The wireless local area network of claim 11, wherein said plurality of client transceiver nodes maintain a count of said received number of first and second beacons.

13. The wireless local area network of claim 11, wherein said plurality of client transceiver nodes attempt to receive a plurality of messages at each of said active client transceiver nodes, re-try to receive ones of said plurality of messages not received during said attempting step, and maintain a count of said re-tried ones of said plurality of messages.

14. The wireless local area network of claim 13, wherein the client transceiver nodes select a data rate lower than said current data rate when said count of said re-tried ones of said plurality of messages exceeds a predetermined number of acceptable re-tried messages, and select a data rate higher than said current data rate when said count of said re-tried ones of said plurality of messages is less than a predetermined number of acceptable re-tried messages.

15. The wireless local area network of claim 11, wherein the network master transmits a channel reservation message at a first data rate, and receives and processes subsequent messages at a second data rate a predetermined time period following said transmission of said channel reservation message.

16. The wireless local area network of claim 11, wherein said first beacon signals are transmitted at a first data rate and said second beacon signals are transmitted at a second data rate.

17. The wireless local area network of claim 11, wherein said table further includes a current modulation type for each of said active client transceiver nodes.

18. The wireless local area network of claim 17, wherein said client transceiver nodes determine an optimal modulation type based upon said difference between said expected number of first and second beacon signals and said received number of first and second beacon signals.

19. The wireless local area network of claim 18, wherein said client transceiver nodes transmit a return signal to said network master designating said determined optimal modulation type.

20. The wireless local area network of claim 19, wherein said network master updates said table to reflect said optimal modulation type as said current modulation type for each of said active client transceiver nodes, subsequent messages from said network master to said active client transceiver nodes thereby being transmitted at said current modulation type for each respective one of said active client transceiver nodes.

21. A wireless local area network having a network master communicating with a plurality of remote client transceiver nodes at plural data rates comprises:
    means for maintaining a table of active client transceiver nodes at said network master, said table including a current data rate for each of said active client transceiver nodes;
    means for transmitting an expected number of first beacon signals and second beacon signals;
    means for receiving and processing a received number of said first and second beacon signals at each of said active client transceiver nodes;
    means for determining an optimal data rate based upon a difference between said expected number of first and second beacon signals and said received number of first and second beacon signals;
    means for transmitting a return signal from each of said active client transceiver nodes to said network master designating said determined optimal data rate; and
    means for updating said table to reflect said optimal data rate as said current data rate for each of said active client transceiver nodes, wherein subsequent messages from said network master to said active client transceiver nodes are transmitted at said current data rate for each respective one of said active client transceiver nodes.

22. The wireless local area network of claim 21, further comprising means for maintaining a count of said received number of first and second beacons.

23. The wireless local area network of claim 21, further comprising:
    means for attempting to receive a plurality of messages at each of said active client transceiver nodes;

means for re-trying to receive ones of said plurality of messages not received during said attempting step; and means for maintaining a count of said re-tried ones of said plurality of messages.

24. The wireless local area network of claim 23, wherein the determining means further comprises:

means for selecting a data rate lower than said current data rate when said count of said re-tried ones of said plurality of messages exceeds a predetermined number of acceptable re-tried messages; and means for selecting a data rate higher than said current data rate when said count of said re-tried ones of said plurality of messages is less than a predetermined number of acceptable re-tried messages.

25. The wireless local area network of claim 21, further comprising:

means for transmitting a channel reservation message at a first data rate; and means for receiving and processing subsequent messages at a second data rate a predetermined time period following said transmission of said channel reservation message.

26. The wireless local area network of claim 21, wherein said first beacon signals are transmitted at a first data rate and said second beacon signals are transmitted at a second data rate.

27. The wireless local area network of claim 21, wherein said table further includes a current modulation type for each of said active client transceiver nodes.

28. The wireless local area network of claim 27, wherein said determining means further comprises means for determining an optimal modulation type based upon said difference between said expected number of first and second beacon signals and said received number of first and second beacon signals.

29. The wireless local area network of claim 28, wherein said means for transmitting a return signal further comprises means for transmitting a return signal from each of said active client transceiver nodes to said network master designating said determined optimal modulation type.

30. The wireless local area network of claim 29, wherein said means for updating said table further comprises means for updating said table to reflect said optimal modulation type as said current modulation type for each of said active client transceiver nodes, wherein subsequent messages from said network master to said active client transceiver nodes are transmitted at said current modulation type for each respective one of said active client transceiver nodes.

31. A wireless local area network comprises a network master adapted to communicate with a plurality of remote client transceiver nodes, said network master comprising a memory having a table defining status of each of said client transceiver nodes, said table including at least a current data rate for each of said client transceiver nodes, said network master transmitting a first beacon signal at a first data rate and a second beacon signal at a second data rate, each of said remote client transceiver nodes being adapted to determine an optimal data rate from said beacon signals and notify said network master of said optimal data rate, whereby said network master updates said table to reflect said optimal data rate for each of said active client transceiver nodes.

32. The wireless local area network of claim 31, wherein said remote client transceiver nodes are further adapted to maintain a count of a received number of first and second beacon signals.

33. The wireless local network of claim 31, wherein the first data rate is greater than the second data rate.

* * * * *